United States Patent
Brem

(10) Patent No.: US 7,202,389 B1
(45) Date of Patent: Apr. 10, 2007

(54) FLASH-PYROLYSIS IN A CYCLONE

(75) Inventor: Gerrit Brem, Wapenveld (NL)

(73) Assignee: Nederlandse Organisatie Voor Toegepast Natuurwetenschappelijk Onderzoek Tno, Delft (NL)

( * ) Notice: Subject to any disclaimer, the term of this patent is extended or adjusted under 35 U.S.C. 154(b) by 0 days.

(21) Appl. No.: 10/129,785

(22) PCT Filed: Nov. 11, 1999

(86) PCT No.: PCT/NL99/00688

§ 371 (c)(1),
(2), (4) Date: Sep. 16, 2002

(87) PCT Pub. No.: WO01/34725

PCT Pub. Date: May 17, 2001

(51) Int. Cl.
*C07C 4/02* (2006.01)

(52) U.S. Cl. ........................ 585/242; 585/241; 585/240

(58) Field of Classification Search ................ 585/242, 585/241, 240
See application file for complete search history.

(56) References Cited

U.S. PATENT DOCUMENTS 5,504,259 A * 4/1996 Diebold et al. ............. 568/697
5,961,786 A * 10/1999 Freel et al. .................. 202/121

FOREIGN PATENT DOCUMENTS

| DE | 27 28 251 A | 1/1978 |
| DE | 27 28 455 | 1/1978 |
| DE | 197 54 802 A | 6/1999 |
| EP | 0 286 160 A | 10/1988 |

OTHER PUBLICATIONS

Lede et al "Flash Pyrolysis of Wood in a Cyclone Reactor" Jul. 1986; pp. 309-317.*

* cited by examiner

*Primary Examiner*—Thuan Dinh Dang
(74) *Attorney, Agent, or Firm*—Young & Thompson

(57) ABSTRACT

A process for the pyrolysis of carbonaceous material is carried out in a cyclone reactor which is fitted with enhanced filtering equipment. In addition the invention relates to the use of a cyclone fitted with a rotating filter as a pyrolysis reactor. By using a cyclone of the rotating separator type as a pyrolysis reactor, carbonaceous material, such as biomass, can effectively be converted in a product having excellent chemical properties and which product is free from particulate matter.

19 Claims, 4 Drawing Sheets

FLASH-PYROLYSIS IN A CYCLONE

BACKGROUND OF THE INVENTION

The invention relates to a process for pyrolysis, carried out in a cyclone reactor. More in detail the present invention relates to a process for the pyrolysis of carbonaceous material carried out in a cyclone reactor which is fitted with enhanced filtering equipment. In addition the invention relates to the use of a cyclone fitted with a rotating filter as a pyrolysis reactor.

DESCRIPTION OF THE RELATED ART

Due to increasing scarcity of fossil fuels, an increasing amount of energy is to be obtained from renewable sources. Thermal conversion of carbonaceous materials, such as biomass and waste, can play an important role to provide materials that can replace fossil fuels. These conversions can be accomplished by pyrolysis processes. Typically, pyrolysis occurs under non-oxidizing conditions in the presence of heat. In the past, pyrolysis has been carried out in reactors with a relatively long pyrolysis time due to low heat transfer rates. However, the products obtained by processes employing a long pyrolysis time often have an unacceptable quality. This has been attributed to excessive cracking of the product, which is caused by the long residence time in the reactor.

A solution to the problems of excessive cracking of the product and/or operating difficulties is a so-called flash-pyrolysis process, which is characterized by short residence times of the products in the reactor. Flash-pyrolysis can for example be carried out in tubular reactors. Use of tubular reactors shortens reaction time due to high heat transfer rates and thus results in less excessive thermal cracking. However, a disadvantage of using a tubular reactor for pyrolysis is the caking or agglomeration problem. Most feed materials pass through a sticky stage during the pyrolysis process. In this stage the particles have the tendency to agglomerate, especially along the walls of the reactor, which causes difficulties in operating such processes.

In the prior art it has also been suggested to carry out flash-pyrolysis processes in cyclones. U.S. Pat. No. 4,151,044 relates to a process for pyrolysis which is carried out in a cyclone reactor. According to this document, the use of a cyclone avoids caking, since the constant swirl of gas flow keeps the particles in movement and thus avoids the formation of agglomerates.

However, an important drawback of pyrolysis process carried out in cyclone reactors results from the generation of small particulate matter during the pyrolysis. The presence of small solid particles in the product is often inevitable. Presence of solid particles detracts from the value of the product stream. The presence of solid particles has also been suggested to play a role in the excessive cracking or other undesired reactions of the compounds in the product stream, since the particles provide a surface area where these undesired reactions can take place. A hydrocarbon product which is contaminated with solids of this size is often unacceptable as a starting material for further processing. In order to make processes based on renewable feed-stock successful and economically feasible, it is of the utmost importance to provide techniques which yield cleaner products.

Although cyclones are capable of removing solid particles from gases through the centrifugal or cyclone action which is typical of these separators, the size of the solids that leave the gas exit of the cyclone can be 50 μm or smaller.

SUMMARY OF THE INVENTION

It is an objective of the present invention to provide a process which solves, at least partly, the problems of excessive cracking, agglomeration of solid particles, presence of solid particles in the product stream, and other drawbacks of the known processes, as mentioned above. The process of the present invention can form an important contribution to the use of renewable materials as a feed-stock for processes that use hydrocarbons.

DESCRIPTION OF THE PREFERRED EMBODIMENTS

Figure 1:
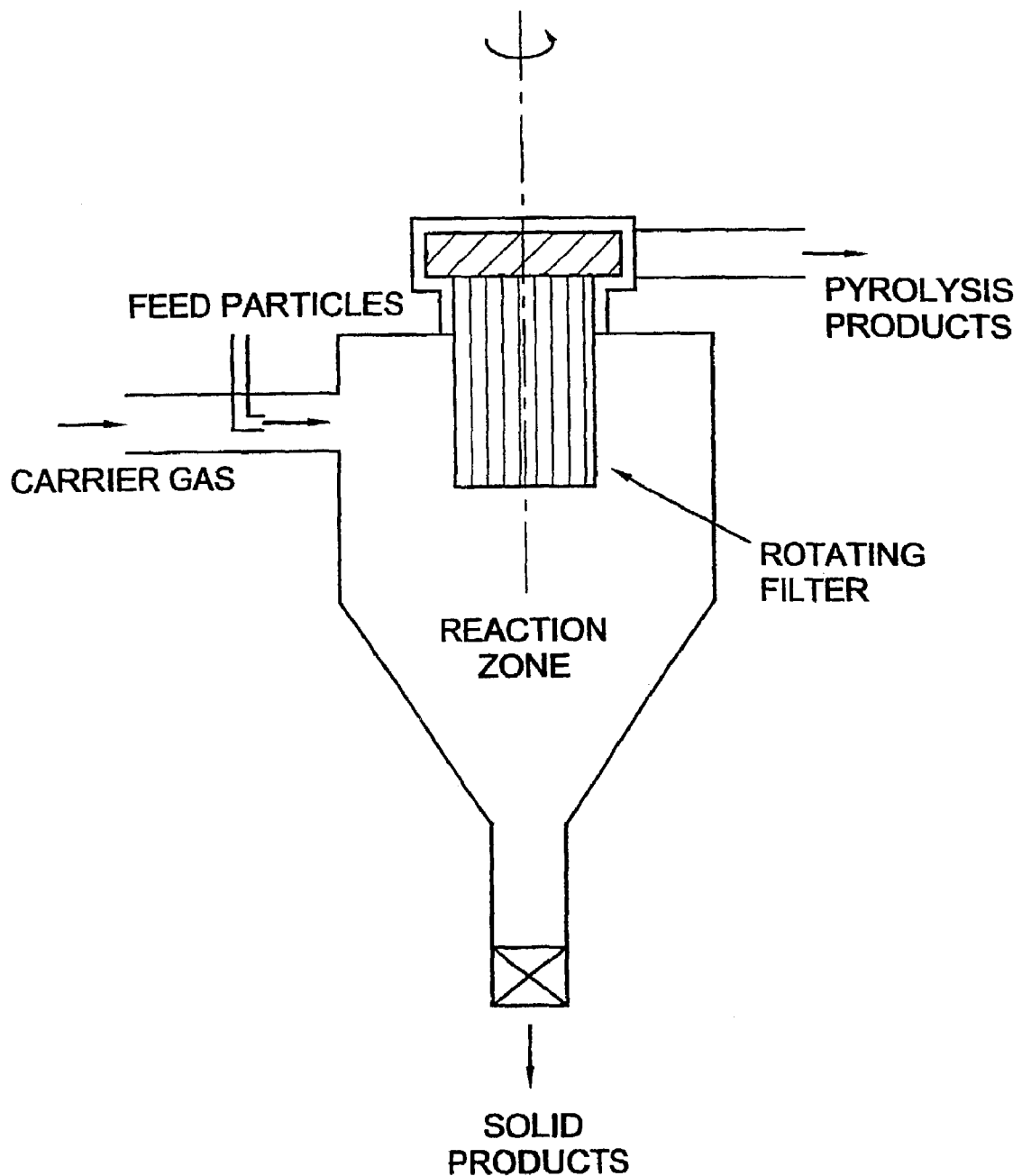
FIG. 1 shows a schematic representation of a cyclone of the rotating separator type, used as a pyrolysis reactor in a process of the present invention.

It has been found that a process for converting a feed stream comprising gas and particles into a product stream comprising the pyrolysis products of said particles and a product stream comprising solids, which process comprises the steps of: i) introducing said feed stream into a cyclone; ii) applying heat to said feed stream in said cyclone to effect pyrolysis of at least part of said particles; and iii) substantially separating solids from gases present in said cyclone by: a) effecting cyclone action; and b) operating a rotating filter which is connected to one of the gas exits of said cyclone; such that said product stream and said solid stream exit substantially as separate streams, at least in part overcomes the above mentioned problems.

According to the process of the present invention, the product stream exits through the rotating filter and the solid stream exits through the solids exit of the cyclone, both streams exiting substantially as separate streams.

With the process of the present invention, an efficient separation of solids from the product gases is obtained. In addition, the separated solids can be reused in the process of the present invention, adding considerably to the economic feasibility, both from the viewpoint of waste-disposal as from the viewpoint of total energy efficiency. Moreover, it has been found that the rotating separator or rotating filter which is a part of the separator used as a pyrolysis reactor in the present invention, can be constructed such that it is able to withstand the corrosive product gases at temperatures close to pyrolysis temperatures. The corrosion can be withstand by a good material selection (e.g. stainless steel) or by supplying additives into the reactor to capture the corrosive components in the product gases (e.g. by limestone injection to capture chlorine). Moreover, the solids are separated from the product gas by the rotating separator in a continuous manner, enabling a continuous operation. The products from the cyclone preferably enter the rotational separator directly after exiting the cyclone. This limits the size of piping and auxiliaries and minimizes the material and/or operational costs. In this way solids present in the products from the cyclone are efficiently separated close to the location where these solids originate. Since the solids that are captured by the rotational filter agglomerate in the channels of the rotating filter, agglomerates of small particles will result, which can, due to their increased size, be effectively separated by the cyclone after being ejected from the rotating filter. In addition, because the rotating filter is located near the cyclone, the heat of the particles captured by the rotating filter can substantially be preserved. The product stream does not have to be cooled, neither actively nor passively, prior to separating the particles therefrom. In this way heat is preserved, which makes the process of the present invention more energy efficient.

The device which is used to contain the pyrolysis reaction according to the present invention, is a cyclone which is fitted with a rotational separator. Both the cyclone and the rotational separator act as separators for solids from gases from the streams which are employed in the process, while the pyrolysis reaction essentially takes place in the cyclone part, although this depends mainly on the temperature distribution in the reactor. When pyrolyzable particles are present at temperatures which are sufficiently high, pyrolysis will take place, whether this is in the cyclone, the rotational filter, or on different locations, such as in the inlet piping.

The cyclone used in the process of the present invention serves at least two purposes; apart from holding the pyrolysis reaction, it also functions as a separator. During or after the pyrolysis process, any solids present in the cyclone are substantially separated from the gases by cyclone action and by a rotating filter which is present on one of the gas exits of said cyclone. The solids present in the cyclone can be solids which were already present in the feed stream or solids that are products of the pyrolysis reaction. As a result of the separation, the product stream and the stream of solids are essentially obtained as separate streams.

The rotating filter is described in detail in U.S. Pat. No. 5,073,177, incorporated herein by reference. It comprises parallel channels and is capable of removing a substantial fraction of solids with a largest cross-section substantially smaller than the cross-section of each of its parallel channels. A suitable embodiment of the rotating filter is a monolith, and it can be made either from a ceramic material, such as cordierite, or a metal, such as stainless steel. Preferably the channels are essentially all of equal diameter. It is also preferred that the channels run in parallel direction, even more preferable parallel to the axis of rotation. Typically, the diameter of the filter element can amount to one meter allowing gas flows of 10.000 $m^3/h$. Typical diameters of the channels in the filter are between from 1 to several mm. The rotating filter is operated by rotating axially, viz. having the axis of rotation parallel to the channels in the filter. Typically, the rotation is carried out at a rotation speed of about 3000 rpm. The rotating filter enables the removal of solid particles having a diameter of less than 50 μm. Solids wish a diameter as small as about 0.1 μm can be removed.

The rotating filter provides an efficient cleaning device which is very versatile, since it introduces a number of parameters which can be chosen and adjusted to meet the requirements of the process. By choosing parameters such as the channel diameter, channel length and rotation speed, the process can be tuned to meet product specifications. This is important, since the pyrolysis process which is carried out in the cyclone reactor has in fact a limited number of degrees of freedom, since it has to perform at least two tasks, more or less simultaneously, viz. holding the pyrolysis reaction and separation. Each of these tasks has its own optimal process parameters and apparatus dimensions. Often these values are different for each respective task and a compromise has to be found. This compromise detracts from the efficiency of at least one of the tasks. The rotational filter enables optimization of the entire process.

The rotational filter is preferably mounted essentially directly on or in one of the gas exits of the cyclone. This way the gas which leaves the cyclone and carries some solids, is forced through the channels of the rotational filter. During its presence in the channels of the rotational filter, the gas is subjected to a centrifugal force field, which results in the solids being forced to the walls of each of the channels, where they are captured, viz. removed from the gas stream and can form agglomerates. The clean gas stream leaves the rotational filter to be processed further. The direction of the product stream is essentially away from the cyclone.

As a result of collecting solids, the walls of the channels in the filter become loaded with the solids. In order to be able to perform the process of the present invention continuously, it is preferred to provide the rotating filter with means to remove the collected solids from the parallel channels. This is preferably done by a fluid jet which blows in a direction opposite to the direction of the product stream through the channels. As a result of blowing the fluid jet, at least a fraction of the collected solids are transported back to the cyclone and can subsequently be separated from the gases by the cyclone action.

By the nature of the pyrolysis process, the blowing fluids are preferably inert to pyrolysis conditions or have no substantial effect at the pyrolysis process. Suitable fluids comprise gases such as steam, pyrolysis gas itself, nitrogen, or other (inert) gases and liquids such as water, oil or other (inert) liquids.

The fluid jet can be mounted such that it can move and eject the solids from one or a group of channels at the same time. This is especially preferred in a continuous operation, since part of the channels remains free for filter action.

In the art, cyclones or vortex separators are well-known devices. A cyclone for use with the present invention, is a device having at least one inlet on a body with essentially circular cross section. Multiple inlets are useful when for example a feed stream and a stream of a heat carrier, such as hot inert particles, have to be injected separately, in order to make sure pyrolysis only takes place inside the reactor. The inlet is preferentially tangential to the body. When used as a separator, a feed stream comprising a fluid and particles to be separated by the cyclone, is injected through the inlet of the cyclone and is forced into a spirally formed path or vortex, along the inner surface of the body. This results in a centrifugal force field, by which particles present in the cyclone are forced in the direction of the inner surface of the cyclone. This centrifugal force field, generated by the cyclone, results in separation of fluids and particles and is referred to as "cyclone action".

When used as a chemical reactor, for example as a pyrolysis reactor, the cyclone functions essentially the same as a physical separator, only the solid particles can originate from the pyrolysis reaction as well. It will be understood that when operated as a pyrolysis reactor according to the present invention, the cyclone separation and reaction processes can take place concomitantly. When used as a pyrolysis reactor, particles to be pyrolyzed are introduced in the inlet of the cyclone, preferably by using an inert carrier gas. During their presence in the reactor at least part of the feed particles undergo a chemical change to form pyrolysis products, while any inert gases will remain unchanged. Pyrolysis products can be either in gaseous, solid or liquid state, although when in liquid state they will usually be part of the solid phase on which such liquids are adsorbed.

The particles are collected at the wall of the cyclone and can slide downwards under the influence of gravity. At the bottom of the cyclone the particles can be collected, optionally as a continuous stream. The cleaned fluids leave the cyclone through one or more gas exits which is preferably situated on top of the cyclone. Conventional cyclones have a cylindrical upper part where the inlet is situated and a conical bottom part. The gas outlet(s) is/are generally located at the top of the cylindrical upper part. One or more solid outlets are usually situated at the lower end of the conical bottom part. Normally the conical bottom part has its smallest cross sectional diameter on the lower end and its highest cross sectional diameter on its upper end where it is connected with the upper part which is usually of the same diameter. Fluids comprise liquids and gases. Particles can be solids but also droplets of liquids.

Figure 3A:
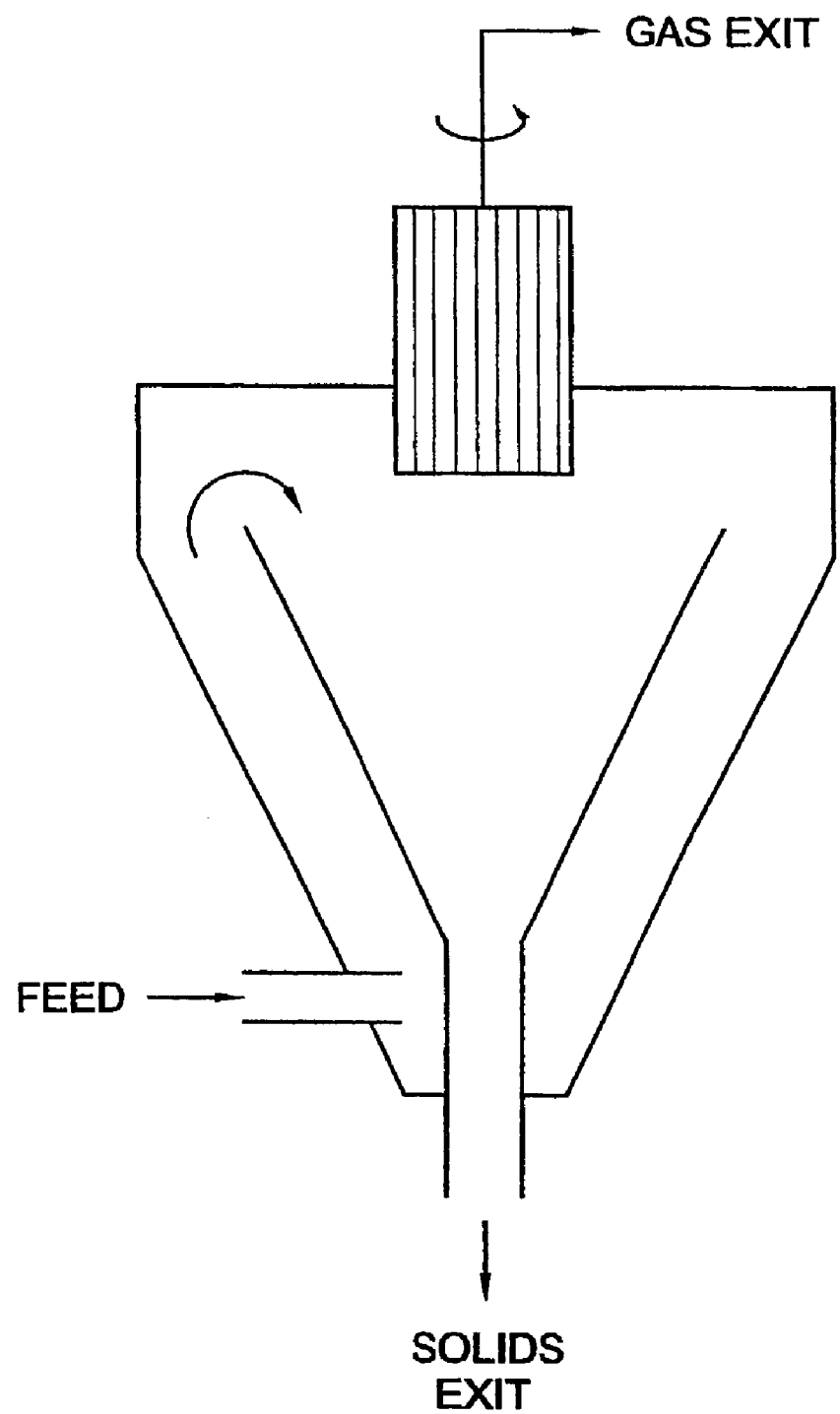
FIG. 3a shows the case of the outer cyclone being the main location for the pyrolysis reaction and the inner cyclone for the separation of gas and solids.

Many additions and alterations to the general concept of cyclones are known in the art, many of which can find use in the process of the present invention. An embodiment which is particularly interesting for the process of the present invention, comprises a cyclone which is operated "bottom-up". In this embodiment the feed enters through an inlet on the lower end of the bottom and the particles move upwards with a speed depending on the force balance of gravity and friction. In this case the particle residence time can be increased. This embodiment can also be extended with an inner cyclone which is placed in the outer cyclone. In that case the outer cyclone is the main location for the pyrolysis reaction and the inner cyclone is meant for the separation of gas and solids (see FIG. 3a).

Figure 3B:
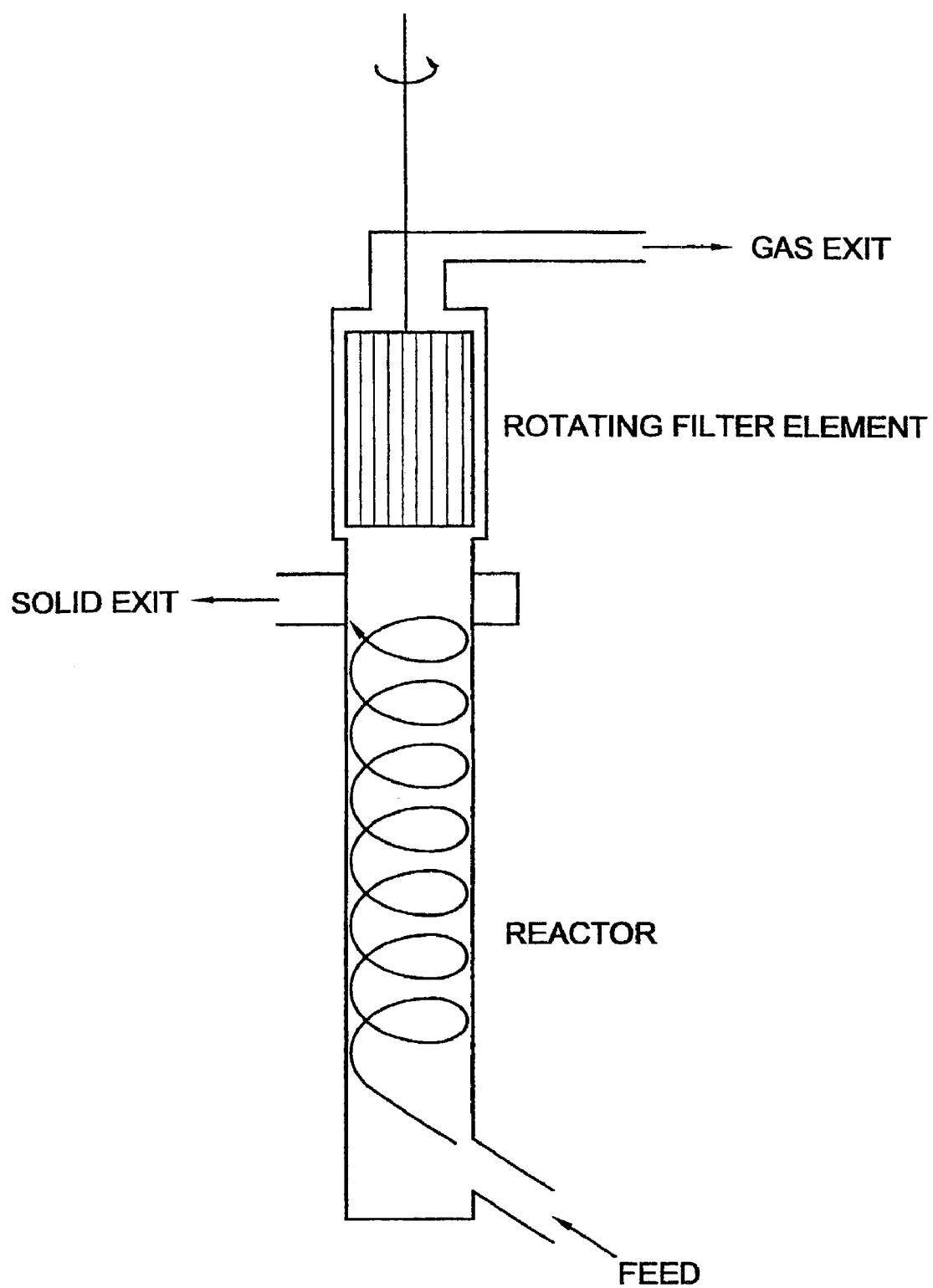
FIG. 3b shows another configuration comprising a pyrolysis reactor in series with an axial rotating filter element.

Another configuration comprises a pyrolysis reactor in series with an axial rotating filter element (see FIG. 3b). The pyrolysis reaction takes place in the reactor and because of the swirl in the reactor the solids leave the reactor at the top via a radial exit. The fine particles are captured by the rotating filter element. The cleaning of the rotating filter element can be done in the same way as described above. The agglomerated fines leave the system via the radial exit. In FIG. 3b the reactor is presented as a swirl (vortex) reactor. Other reactor types that can be used in the same configuration are: cyclone reactor, entrained flow reactor, fluidized bed reactor, torbed reactor, etc.

According to the present invention, the fluids are forced through the cyclone and the rotational separator by any conventional means. Preferably the feed particles are carried by a feed stream which comprises an inert gas. This gas is forced through the process using known devices such as pumps or fans or any other pressure drop inducing device. A preferred embodiment comprises a fan that is directly fitted on the gas outlet of the cyclone. Even more preferably this fan is rotated by the same axis as the rotating filter. By adjusting the rotation speed the fan it is also possible to simulate a zero pressure drop over the entire process. The particles to be pyrolized by the process of the present invention can be any hydrocarbon containing material (carbonaceous material). Usually the particles will be in the form of solids, although it is also possible to use particles which are droplets of liquid. Preferably these particles comprise biomass. The process can also be used for processing waste, preferably plastic containing waste, such as electronic components. With the process of the present invention the particles are converted to product streams. For example, when wood particles are used as a feed, the condensed product stream typically comprises at room temperature about 70 wt. % of so-called bio-oil, about 20 wt. % of gaseous, compounds and about 10 wt. % of char, which is a solid fraction having a composition that is comparable to char coal. The char fraction is essentially obtained separately as the solid product and can be used to provide heat for the pyrolysis reaction.

Typically, the physical properties and the chemical composition of the bio-oils produced by the process of the present invention are as follows:

| | |
|---|---|
| moisture: | 15–30 wt-% |
| specific gravity: | 1.15–1.25 kg/l |
| heating value: | 14–18 MJ/kg |
| viscosity: | $30 \cdot 10^{-6}$–$60 \cdot 10^{-6}$ m$^2$/s (30–60 cSt) at 40° C. |
| acidity: | 2.5–4.0 (pH) |
| carbon: | 50–60 wt-% |
| hydrogen: | 5–7 wt-% |
| nitrogen | 0.1–0.4 wt-% |
| sulfur: | 0–0.1 wt-% |
| oxygen: | 34–43 wt-% |
| ash: | 0.1–0.2 wt-% |

The particles to be pyrolyzed can be of any size and shape which is practically allowable, viz. which size for example allows transport by means of a carrier gas. Preferably the size of the particles is less than 10 mm, most preferably 2–4 mm.

The heat required for the pyrolysis can be applied by heating the wall of the cyclone by any conventional means, such as electric heaters or furnaces. Product gases or liquids can be used to supply this heat. More preferably however, this heat is obtained from the char fraction of the product.

It is also possible to apply heat by means of heated inert solids which are injected in the cyclone. Preferably these heated solids are obtained by burning char in the presence of these inert solids. The inert solids can also be heated using the combustion heat of (part of) the product gases. To ensure that pyrolysis takes place in the cyclone and not before, it is preferred to introduce the hot inert solids and the feed particles as separate streams in the cyclone or to mix them just before the cyclone entrance.

The solid products which are collected at the solid exit of the cyclone, may comprise inert solids, pyrolysis products and optionally unconverted feed particles. It will be understood that also unconverted feed components can be used to heat inert particles.

The solid feed of the process of the present invention may advantageously further comprises a catalyst. Such a catalyst may be used to further control the chemical processes that take place inside the reactor. A catalyst may also be present on or inside the walls of the rotating filter. Examples of such catalysts are zeolites, clay-based and metal based catalysts.

The temperature at which the pyrolysis reaction is carried out should be sufficiently high. Typically, this temperature is from 300–1000° C., preferably from 500–850° C. The preferred temperature range depends on the preferred products. To produce bio-oil the preferred temperature is 500–600° C. To produce fuel gas the preferred temperature range is 600–800° C. The production of certain chemicals will strongly influence the pyrolysis temperature.

The average pressure is atmospheric. Higher and lower pressures can be used depending on the desired products (quantity and composition). Lower pressures will reduce the residence time and will increase the product gas yield. Higher pressures can preferably be used for a direct coupling of the pyrolysis reactor with a gas turbine.

The average residence time of the particles and the gas in the cyclone according to the process of the present invention is usually less than 1000 ms, preferably about 500 ms. If longer residence times for a complete particle conversion are applied, the product yield (e.g. the yield of bio-oil) is decreased and more solid char will be produced.

The residence time of the (pyrolysis) gas in the reactor will usually be smaller than one second. Longer residence times may result in secondary reactions such as cracking and this will lower the product yield of the process.

The process of the present invention is advantageously carried out in a continuous manner.

In FIG. 1 a schematic representation of a cyclone of the rotating separator type, used as a pyrolysis reactor in a process of the present invention is given.

Figure 2:
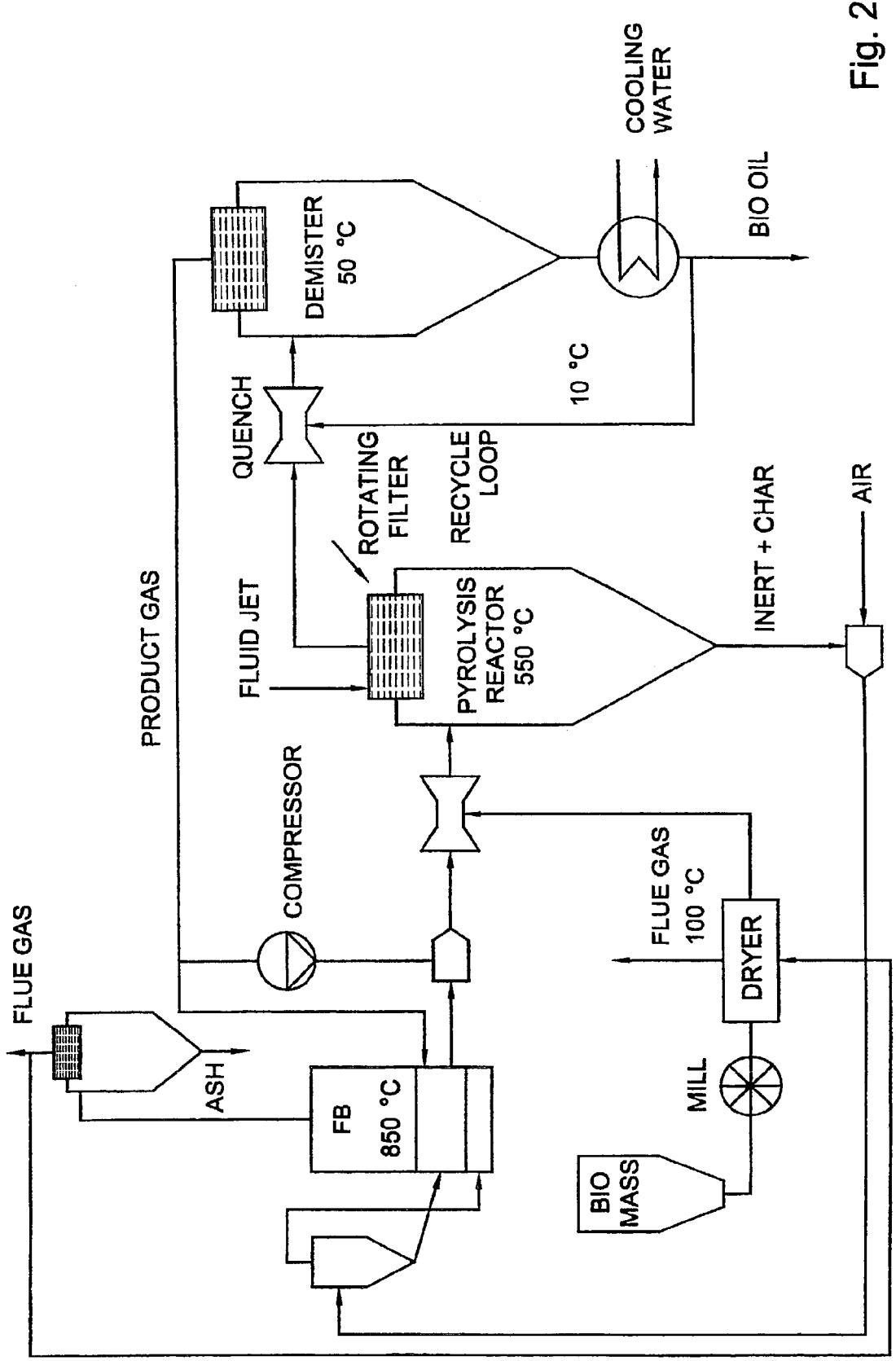
FIG. 2 is an example for carrying out the process of the present invention.

In FIG. 2 an example for carrying out the process of the present invention is given. According to this example biomass is first fed to a mill where it is processed to a suitable particle size. Subsequently these particles are dried using waste heat from the char burner. The dried particles are fed to the cyclone reactor using a gas stream which also carries inert heated particles. After the pyrolysis reaction, the gaseous pyrolysis products leave the reactor through the rotating filter, while the solid products leave the bottom of the cyclone. The rotating filter is equipped with a fluid jet to remove (agglomerates of) particles from channels of the rotating filter and eject them back into the cyclone.

The gaseous pyrolysis products are first quenched in order to liquefy them and subsequently fed to a demister. At the bottom of the demister bio-oil is obtained after cooling. A part of the bio-oil stream can be recirculated to effect the quenching of the gaseous products. The top of the demister comprises the inert carrier gas, and optionally non-condensed gaseous products. Preferably an additional rotating particle separator is used as condenser and demister. In the cyclone the gaseous pyrolysis products can be quenched by spraying bio-oil into the cyclone and the rotating filter can be used as demister.

The solid bottom products from the cyclone reactor, which comprise char, inert solids, and optionally unconverted feed material are fed to a char burner reactor, which is preferably a fluidized bed (FB) reactor. Air can be used as a carrier gas to transport the solids. Prior to feeding the particles to the FB reactor, they can be separated, so that the solid particles are fed in the reaction zone of the FB and the air is injected beneath in order to keep the solids in fluidized state.

A stream of product gas from the demister, which comprises inert carrier gas, is subsequently fed to the FB reactor to transport the heated particles to the pyrolysis reactor. The product gases of the FB mainly comprise $CO_2$ and $H_2O$, and other gaseous reaction products from the burning of char. After filtering these FB product gases part can be recycled to be used in the dryer and part is let off as flue gas.

The invention will now be illustrated by the following examples.

EXAMPLE 1

A 5 kW PYROS-reactor was built in accordance with the process of the invention. Wood particles of an average size of 0.5 mm were used as a feed. 50–60 wt-% of the feed was converted into oil. During the experiments the fast pyrolysis temperature was varied between 480 and 550° C.

The quality of the oil was analyzed. The oil produced in the PYROS-reactor had the following properties:

| | |
|---|---|
| heating value: | 14.8 MJ/kg |
| moisture content: | 30.9 wt-% |
| density (25° C.): | 1.2 g/cc |
| pH: | 2 |
| viscosity at 40° C.: | 14.63 mm$^2$/s |

EXAMPLE 2

A technical feasibility study was carried out for the fast pyrolysis of electronics residues. The fast pyrolysis process was carried out at about 500–550° C. The product streams of the thermal process comprised about 35% oil, and 40% ferro-metals and 12.5% non-ferro-metals. The oil could be used for energy production purposes while the metals could be re-used. The rest of the products consists of non-condensable gas and a carbon fraction (char). Both streams could (partly) be used for the internal energy demand of the endothermic fast pyrolysis process.

The invention claimed is:

1. Process for converting a feed stream comprising gas and particles into a pyrolysis product stream comprising the pyrolysis products of said particles and a solid stream comprising solids, the process comprising the steps of:
   i) introducing said feed stream into a cyclone;
   ii) applying heat to said feed stream in said cyclone to effect pyrolysis of at least part of said particles; and
   iii) substantially separating solids from gases by:
   a) effecting cyclone action, and
   b) operating a rotating filter which is connected to one of the gas exits of said cyclone, such that said pyrolysis product stream and said solid stream exit as separate streams, the pyrolysis product stream essentially free of solids with solids having a diameter from between about 0.1 μm and 50 μm being removed from the pyrolysis product stream exiting the rotating filter,
   the product stream exiting the cyclone and entering the rotating filter remains uncooled so that heat within the solids entering the rotating filter is not lost to cooling prior to the solids being separated from the pyrolysis product stream within the rotating filter so that the solids are removed from the pyrolysis product stream while preserving the heat within the solids.

2. Process according to claim 1 wherein,
   said gas of said feed stream comprises an inert carrier gas, and
   the pyrolysis product stream is a gas stream with carbonaceous solids having a diameter from between about 0.1 μm and 50 μm being removed from the pyrolysis product stream by the rotating filter
   the product stream exiting the cyclone and entering the rotating filter remains uncooled so that heat within the solids entering the rotating filter is not lost to cooling prior to the solids being separated from the pyrolysis product stream within the rotating filter so that the solids are removed from the pyrolysis product stream while preserving the heat within the solids.

3. Process according to claim 1 wherein said heat is applied by heating the wall of said cyclone.

4. Process according to claim 1 wherein said solid stream comprises inert solids, pyrolysis products and optionally unconverted feed particles.

5. Process according to claim 4 wherein said heat is applied by said inert solids having a temperature which is sufficient to induce said pyrolysis.

6. Process according to claim 5 wherein the solids are fed to a burner reactor wherein the converted particles and optionally the unconverted particles are burned to heat said inert solids, which hot inert solids are subsequently used to apply said heat in said cyclone.

7. Process according to claim 1 wherein said feed stream further comprises a solid catalyst.

8. Process according to claim 1 wherein said particles contain hydrocarbons.

9. Process according to claim 1 wherein said particles comprise biomass or waste.

10. Process according to claim 1 wherein said rotating filter comprises a catalyst.

11. Process according to claim 1 wherein said rotating filter comprises channels which collect said solids, which channels can be cleaned by a fluid jet flowing in a direction opposite to the direction of the product stream through said channels, whereby at least a fraction of said collected solids are transported to said cyclone and subsequently can be separated from said gases by said cyclone action.

12. Process according to claim 1 wherein the pyrolysis temperature is 300–1000° C.

13. Process according to claim 1 wherein said pyrolysis is carried out at approximately atmospheric pressure.

14. Process according to claim 1, wherein,
the size of said particles is less than 10 mm, and
the pyrolysis temperature is 500–850° C.

15. Process according to claim 1 wherein the average residence time of the particles and the gas in the cyclone is less than 1000 ms.

16. Process according to claim 1 wherein the cyclone is of the bottom-up type.

17. Process according to claim 1 which is continuous.

18. Process according to claim 1 wherein,
said feed stream further comprises a solid catalyst in the form of one of a zeolite, a clay-based catalyst, and a metal-based catalyst,
said particles comprise one of wood and plastic,
said rotating filter comprises a catalyst in the form of one of a zeolite, a clay-based catalyst, and a metal-based catalyst,
the pyrolysis temperature is 500–600° C.,
the size of said particles is less than 2–4 mm,
the average residence time of the particles and the gas in the cyclone is about 500 ms.

19. Process according to claim 1, wherein the product stream exiting the rotating filter is quenched in order to liquefy said pyrolysis product and subsequently fed to a demister, which demister comprises a cyclone and a rotating filter.

* * * * *